United States Patent
Chen et al.

(10) Patent No.: US 10,718,128 B2
(45) Date of Patent: Jul. 21, 2020

(54) VEHICLE INSPECTION SYSTEM, METHOD AND SMART GARAGE

(71) Applicant: NUCTECH COMPANY LIMITED, Beijing (CN)

(72) Inventors: Zhiqiang Chen, Beijing (CN); Yuanjing Li, Beijing (CN); Jianmin Li, Beijing (CN); Shangmin Sun, Beijing (CN); Yu Hu, Beijing (CN); Yuan Ma, Beijing (CN); Qiangqiang Wang, Beijing (CN)

(73) Assignee: NUCTECH COMPANY LIMITED, Beijing (CN)

( * ) Notice: Subject to any disclaimer, the term of this patent is extended or adjusted under 35 U.S.C. 154(b) by 37 days.

(21) Appl. No.: 15/857,645

(22) Filed: Dec. 29, 2017

(65) Prior Publication Data
US 2018/0187443 A1    Jul. 5, 2018

(30) Foreign Application Priority Data

Dec. 29, 2016    (CN) .......................... 2016 1 1239978

(51) Int. Cl.
*G06F 7/00*    (2006.01)
*E04H 6/36*    (2006.01)
(Continued)

(52) U.S. Cl.
CPC .............. *E04H 6/36* (2013.01); *B65G 47/90* (2013.01); *B65G 67/02* (2013.01); *E04H 6/34* (2013.01);
(Continued)

(58) Field of Classification Search
None
See application file for complete search history.

(56) References Cited

U.S. PATENT DOCUMENTS

| 6,542,580 | B1 * | 4/2003 | Carver .................. G01N 23/04 378/57 |
| 2007/0040911 | A1 * | 2/2007 | Riley ..................... H04N 7/181 348/148 |
| 2010/0076631 | A1 * | 3/2010 | Mian .................... G05D 1/0229 701/19 |

FOREIGN PATENT DOCUMENTS

| DE | 29803989 U1 | 12/1998 |
| JP | 2014153099 A | 8/2014 |

OTHER PUBLICATIONS

European Search Report dated May 15, 2018 in the corresponding EP application (application No. 17210393.9).

* cited by examiner

*Primary Examiner* — Yolanda R Cumbess
(74) *Attorney, Agent, or Firm* — Kilpatrick Townsend & Stockton, LLP

(57) ABSTRACT

A vehicle inspection system is described. The vehicle inspection system comprises: an inspection device, for performing an inspection on a vehicle to be inspected; a carrier platform, for carrying the vehicle to be inspected; and an unmanned controlled travelling device for moving the carrier platform to pass through a scanning area of the inspection device, so as to perform the inspection on the vehicle to be inspected. In the present disclosure, the vehicle to be inspected is carried by the carrier platform, and the unmanned controlled travelling device is used to move the carrier platform to pass through the scanning area of the inspection device, so that the vehicle to be inspected can be subject to inspection smoothly. There is no driver required to drive through the scanning area in this process, thus avoiding exposure of a driver to a threat of radiation.

10 Claims, 2 Drawing Sheets

(51) Int. Cl.
*E04H 6/42* (2006.01)
*E04H 6/34* (2006.01)
*B65G 47/90* (2006.01)
*B65G 67/02* (2006.01)

(52) U.S. Cl.
CPC ............... *E04H 6/42* (2013.01); *E04H 6/422* (2013.01); *B65G 2201/0294* (2013.01); *B65G 2813/00* (2013.01); *B65G 2814/0313* (2013.01)

VEHICLE INSPECTION SYSTEM, METHOD AND SMART GARAGE

RELATED APPLICATION

This disclosure claims the priority of the Chinese patent application No. 201611239978.9 submitted to the Chinese Patent Office on Dec. 29, 2016, the title of which is "AUTOMATIC VEHICLE INSPECTION SYSTEM, METHOD AND SMART GARAGE", and the entire disclosure of which is hereby incorporated by reference.

FIELD OF THE INVENTION

The present disclosure relates to the field of safety inspection, and more particularly to an vehicle inspection system and a method and a smart garage.

BACKGROUND OF THE INVENTION

With an increasingly tight use of space within a city, conventional garages occupy a large area, and are difficult to adapt to a more compact, and high-traffic occasion. In order to solve this problem, at present there has been a smart parking garage that can realize automatic parking. This smart garage often includes a multistory, three-dimensional garage that is capable of automatically conveying a vehicle of a user to a designated parking position by intelligent control, and conveying the vehicle of the user to a designated return location when the user retrieves the vehicle.

On the other hand, there are two common safety inspection manners of small vehicles at present: one by a driver to directly drive through a safety inspection gate, and the other by a conveyor to drag a small vehicle through a safety inspection gate. Both of these safety inspection manners are present with certain limitations. Among them, the driver driving manner involves radiation protection laws and regulations, and many countries or regions do not allow drivers to be scanned, thus affecting the applicability of such safety inspection manner. Further, the conveyor, although in diversified forms, including one-segment or two-segment, unilateral or bilateral drag, etc., may all involve civil engineering of the conveyor no matter which form is used. Such civil engineering is comparatively complicated, and the entire system presents a poor flexibility.

With the national anti-terrorism and explosion-proof needs, there is also a safety demand for vehicles within a garage as well as the garage itself at present. However, due to their respective limitations, the aforementioned two small vehicle safety inspection manners are difficult to apply directly to the automatic parking inspection of a smart garage, so as to meet the safety requirements of the vehicles within a garage as well as the garage itself.

SUMMARY OF THE INVENTION

The object of the present disclosure is to propose an vehicle inspection system, a method and a smart garage which can conveniently realize inspection of a vehicle and avoid scanning a driver.

In order to realize the aforementioned object, the present disclosure provides an vehicle inspection system, comprising:
an inspection device, for performing an inspection on a vehicle to be inspected;
a carrier platform, for carrying the vehicle to be inspected; and
an unmanned controlled travelling device, for moving the carrier platform to pass through a scanning area of the inspection device, so as to perform the inspection on the vehicle to be inspected.

Further, the unmanned controlled travelling device comprises:
a vehicle body, for travelling under remote control, and carrying the carrier platform;
a vertical driving mechanism, provided on the vehicle body, for moving the carrier platform off the ground or placing the carrier platform on the ground; and
a horizontal driving mechanism, provided on the vehicle body, for driving the carrier platform to pass through the scanning area of the inspection device.

Further, the carrier platform is configured to contain the unmanned controlled travelling device under the carrier platform; the vertical driving mechanism comprising a lifting mechanism, for moving the carrier platform off the ground when the unmanned controlled travelling device is located under the carrier platform.

Further, the horizontal driving mechanism comprises a dragging mechanism with a connecting piece, for connecting the connecting piece with the carrier platform, and dragging the carrier platform across the scanning area of the inspection device by movement of the vehicle body.

Further, the unmanned controlled travelling device is an Automated Guided Vehicle.

Further, the carrier platform comprises a platform body and a support portion, the support portion is provided under the platform body, and supportable on the ground, for forming a space accommodating entry of the unmanned controlled travelling device.

Further, a vertically penetrating through-hole is provided on the middle of the platform body, and the inspection device is a top radiation scanning inspection device, for forming a scanning area from top to bottom.

In order to realize the aforementioned object, the present disclosure further provides a smart garage, comprising:
the vehicle inspection system according to claim 1,
a parking area, for parking a plurality of said carrier platforms or vehicles, the unmanned controlled travelling device for conveying the carrier platform to the parking area after accomplishing inspection of the vehicle to be inspected.

Further, comprising a loading station and a unloading station, wherein the unmanned controlled travelling device is configured to convey the empty carrier platform to the loading station, so that the vehicle to be inspected travels on its own or is driven to the carrier platform; the unmanned controlled travelling device is configured to move to the parking area of a vehicle to be unloaded upon receiving a loading instruction, and drive the carrier platform carrying the vehicle to be unloaded to move to the unloading station.

In order to realize the aforementioned object, the present disclosure further provides an automatic vehicle inspection method, comprising:
after the vehicle to be inspected is loaded on the carrier platform, the unmanned controlled travelling device moves the carrier platform to pass through a scanning area of the inspection device to perform an inspection of the vehicle to be inspected on the carrier platform;
after inspection of the vehicle to be inspected is accomplished, the unmanned controlled travelling device drives the carrier platform to another target area.

Further, the another target area is a designated parking area or an exit for safety inspection area corresponding to the vehicle to be inspected.

Further, the unmanned controlled travelling device comprises a vehicle body, a vertical driving mechanism and a horizontal driving mechanism, wherein the vertical driving mechanism and the horizontal driving mechanism are disposed on the vehicle body; the step that the unmanned controlled travelling device drives the carrier platform to pass through a scanning area of the inspection device comprises:

the unmanned controlled travelling device carries the carrier platform by moving the carrier platform off the ground by means of the vertical driving mechanism; and when the vehicle body moves to the vicinity of the inspection device, the vertical driving mechanism moves the carrier platform to the ground, and the horizontal driving mechanism drives the carrier platform to pass through the scanning area of the inspection device.

Further, the horizontal driving mechanism comprises a dragging mechanism; the step that the horizontal driving mechanism drives the carrier platform to pass through the scanning area of the inspection device comprises:

connecting the connecting piece of the dragging mechanism with the carrier platform, and dragging the carrier platform across the scanning area of the inspection device by movement of the vehicle body.

Further, the vertical driving mechanism comprises a lifting mechanism, such that the carrier platform contains the unmanned controlled travelling device under the carrier platform when the carrier platform is located on the ground, and the unmanned controlled travelling device moves the carrier platform off the ground by the lifting mechanism under the carrier platform.

Further, before loading the vehicle to be inspected on the carrier platform, further comprising:

the unmanned controlled travelling device conveys the empty carrier platform to the loading station so that the vehicle to be inspected travels on its own or is driven to the carrier platform.

Further, upon receiving a unloading instruction, the unmanned controlled travelling device moves to the parking area of a vehicle to be unloaded, and drives the carrier platform carrying the vehicle to be unloaded to move to the unloading station.

On the basis of the aforementioned technical solution, in the present disclosure, the vehicles to be inspected is carried by the carrier platform, and the unmanned controlled walking device is used to move the carrier platform to pass through the scanning area of the inspection device, so that the vehicle to be inspected can be carried out inspection smoothly. There is no driver required to drive through the scanning area in this process, thus avoiding exposure of a driver to a threat of radiation. Moreover, as movement of the carrier platform is driven by the unmanned controlled walking device, compared to a conveyor, civil engineering construction may be omitted, while the inspection device may also be relocated at any time, thereby improving the flexibility and applicability of the automatic vehicle inspection system.

BRIEF DESCRIPTION OF THE ACCOMPANYING DRAWINGS

The drawings described herein are used to provide a further understanding of the present disclosure and constitute a part of the present application. The illustrative embodiments of the present disclosure as well as the descriptions thereof, which are used for explaining the present disclosure, do not constitute improper definitions on the present disclosure. In the drawings.

DETAILED DESCRIPTION OF EMBODIMENTS

Next, the technical solution of the present disclosure is further described in detail by means of the drawings and embodiments.

Figure 1:
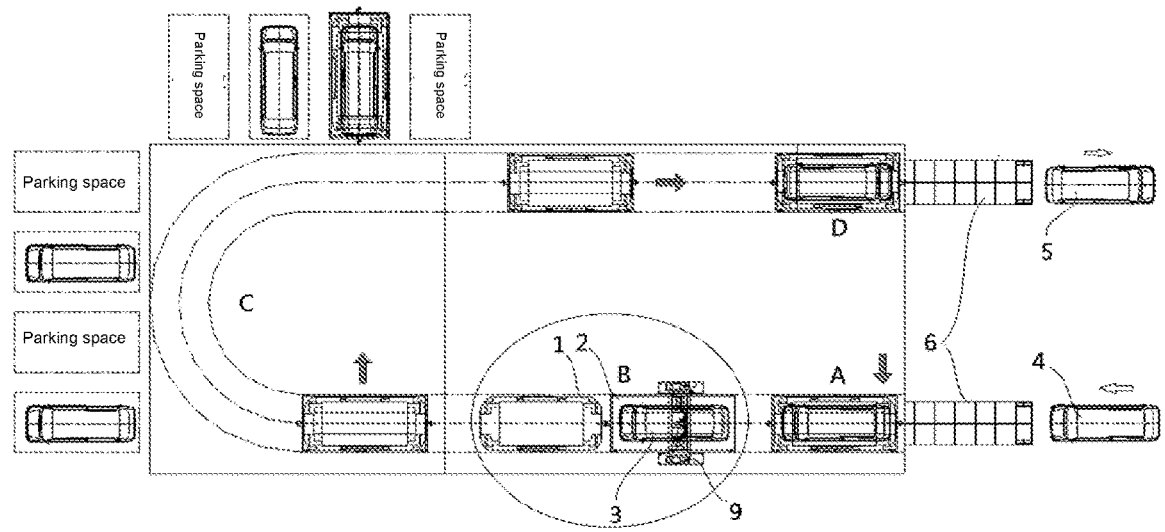
FIG. 1 is a schematic flow chart of performing parking, inspection, and vehicle unloading of an embodiment of a smart garage according to the present disclosure.

As shown in FIG. 1, it is a schematic flow chart of performing parking, inspection, and vehicle unloading of an embodiment of a smart garage according to the present disclosure. In FIG. 1, the smart garage first includes a parking area C that parks a plurality of carrier platforms 2 or vehicles, and also includes an vehicle inspection system for the vehicles which enter the garage for parking. It can be seen from FIG. 1 that, a plurality of parking spaces located at the parking area C may include an ordinary vehicle, and may also include a carrier platform 2 that supports an ordinary vehicle. These parking spaces may be provided in such a form as to be adapted for parking an ordinary vehicle and a carrier platform 2 at the same time, and may also set their respective form suitable for parking. In another embodiment, it is also possible to only provide within a smart garage a parking area for parking the carrier platform 2.

In this embodiment, the vehicle inspection system may comprise: an inspection device 9, a carrier platform 2 and an unmanned controlled travelling device. Among them, the inspection device 9 is used for performing inspection of a vehicle 4 to be inspected, such as a non-contact inspection system and the like, which performs scanning imaging of the vehicle to be inspected by radiation, so as to identify whether the vehicle to be inspected internally carriers dangerous goods. The carrier platform 2 is used for carrying vehicles. It can park at the parking area and stably support the vehicles.

The unmanned controlled travelling device is responsible for driving the carrier platform 2 through the scanning area of the inspection device 9. In other words, the carrier platform 2 and the vehicle 4 to be inspected carried are both driven by the unmanned controlled travelling device to move, and to further accomplish such a process as to pass through the scanning area of the inspection device 9. In addition to driving the carrier platform 2 through the scanning area of the inspection device 9, the unmanned controlled travelling device may also drive the carrier platform 2 to move within a movement area of the carrier platform 2. For example, after inspection of the vehicle 4 to be inspected is accomplished, the carrier platform 2 is conveyed to the parking area C, or when it is necessary to have a vehicle unloaded, the carrier platform 2 carrying the vehicle to be unloaded 5 is conveyed to the unloading station D. Still alternatively, when it is necessary to perform an operation of vehicle entering a garage, an empty carrier platform 2 is conveyed to the loading station A or the like.

The unmanned controlled travelling device may use an unmanned travelling device that is remotely controlled or automatically controlled. For example, an Automated Guided Vehicle AGV, its accessible range may be inside the smart garage, to effectuate entry and exit of vehicles. AGV can flexibly drive the carrier platform to move forward/backward, turn or translate, so as to realize motion of a single AGV as well as movement across of a plurality of AGVs within the accessible range.

In the present embodiment, the vehicle to be inspected is carried by the carrier platform and the unmanned controlled travelling device is used to drive the carrier platform to pass through the scanning area of the inspection device, so that the vehicle to be inspected can be carried out inspection smoothly, thus improving the passing rate of vehicles. There is no driver required to drive through the scanning area in this process, thus avoiding a threat that the driver is exposed to radiation. Moreover, as movement of the carrier platform is driven by the unmanned controlled travelling device, compared to a conveyor, civil engineering construction may be omitted, while the inspection device may also be relocated at any time, thereby improving the flexibility and applicability of the vehicle inspection system.

In order to facilitate that the vehicle entering the garage can be carried on the carrier platform 2, a ramp 6 may be provided at the loading station A (for example, entrance of a smart garage), so that the vehicle 4 to be inspected can reach an upper surface of the carrier platform 2 through a top of the ramp 6. This process may be accomplished by driver driving, and may also be realized by other traction tools or driving programs. In another embodiment, a depressed tunnel may also be provided at the loading station A. When the carrier platform 2 is in the tunnel, the upper surface thereof is flush with the ground, so that the vehicle 4 to be inspected directly moves to the upper surface of the carrier platform 2.

Similarly, in order to facilitate that the vehicle exiting from the garage can conveniently depart from the carrier platform 2, a ramp 6 may also be provided at the unloading station D (such as an outlet of the intelligent garage and the like), so that the vehicle 5 to be unloaded can leave the carrier platform 2 from the upper surface of the carrier platform 2 via the ramp 6. This process may be accomplished by driver driving, and may also be realized by other traction tools or driving programs. In another embodiment, a depressed tunnel may also be provided at the unloading station D. When the carrier platform 2 is in the tunnel, the upper surface thereof is flush with the ground, so that the vehicle 5 to be unloaded directly moves to the ground from the upper surface of the carrier platform 2.

Corresponding to the unmanned controlled travelling device and the carrier platform which may respectively use different structural forms, the driving manner of the unmanned controlled travelling device for the carrier platform is also different. For example, the unmanned controlled travelling device always drives the carrier platform to move on the ground, and pass through the scanning area in a dragging manner; or the unmanned controlled travelling device drives the carrier platform to move on the ground, and pass through the scanning area in a pushing manner. Still alternatively, the unmanned controlled travelling device backs up the carrier platform to move on the ground, and pass through the scanning area in a supporting manner; or the unmanned controlled travelling device backs up the carrier platform to move on the ground in a supporting manner, and drives the carrier platform to pass through the scanning area in a dragging or pulling manner.

Figure 2:
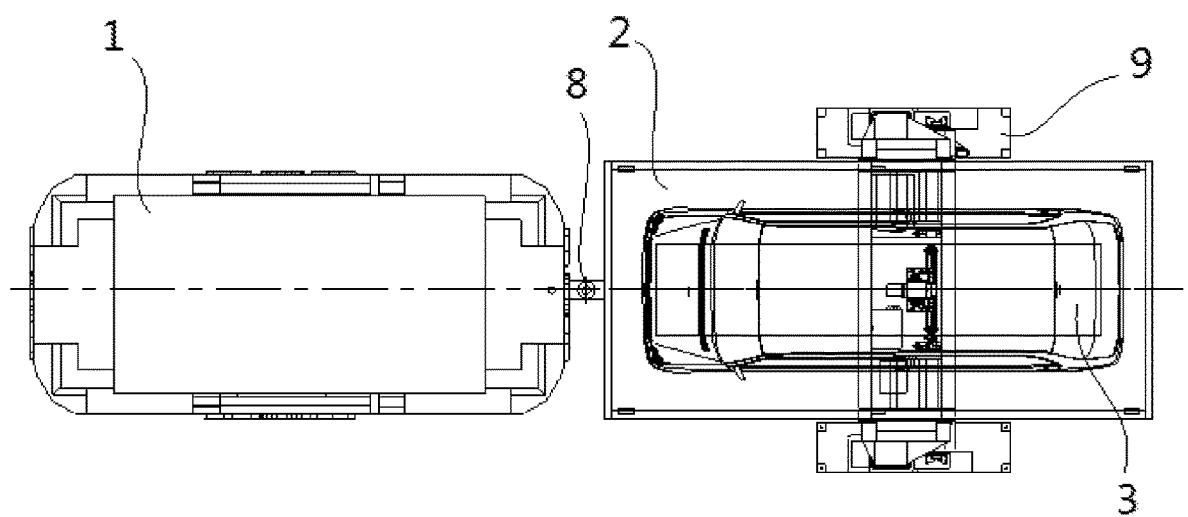
FIG. 2 is an enlarged schematic view of an elliptical portion in FIG. 1.

Next, in combination with an enlarged view as shown in FIG. 2, detailed description is made to an implementation process of driving the carrier platform 2 to pass through the scanning area of the inspection device 9 by the unmanned controlled travelling device.

In the present example, the unmanned controlled travelling device has such two carrier platform driving manners as a vertically supporting carrier platform and a horizontally driving carrier platform. Thus, the unmanned controlled travelling device includes a vehicle body, a vertical driving mechanism and a horizontal driving mechanism. Among them, the vertical driving mechanism is provided on the vehicle body, for moving the carrier platform 2 off the ground or placing the carrier platform 2 on the ground. The horizontal driving mechanism is also provided on the vehicle body, for driving the carrier platform 2 to pass across a scanning area of the inspection device 9. The vehicle body is used for travelling under remote control, and carrying the carrier platform 2. Such carrying may be a direct supporting effect of the vehicle body over the lower surface of the carrier platform 2, and may also be an indirect supporting effect of the carrier platform 2 by means of the vertical driving mechanism.

In order to realize the vertical support of the unmanned controlled travelling device over the carrier platform, a space capable of accommodating entry of the unmanned controlled travelling device is preferably formed under the carrier platform 2. In one embodiment, the carrier platform 2 may comprise a platform body and a support portion which is provided under the platform body, is supportable on the ground, and forms a space accommodating entry of the unmanned controlled travelling device. Correspondingly, the vertical driving mechanism includes a lifting mechanism capable of moving the carrier platform 2 off the ground when the unmanned controlled travelling device is located under the carrier platform 2. In this way, when there is a need for the unmanned controlled travelling device to back up the carrier platform 2 to move on the ground in a supporting manner, it is possible to first allow the unmanned controlled travelling device to enter the lower space of the carrier platform 2, and then utilizing the lifting mechanism to uphold the carrier platform 2 upwards, such that the unmanned controlled travelling device may drive the carrier platform 2 and even the vehicle carried thereon to move together by means of own motion.

In order to effectuate horizontally driving the carrier platform by the unmanned controlled travelling device, it is preferable that the horizontal driving mechanism includes a dragging mechanism with a connecting piece (for example, a connecting pin 8 in FIG. 2), which is capable of connecting the connecting piece with the carrier platform 2, and dragging the carrier platform 2 across the scanning area of the inspection device 9 by movement of the vehicle body. In another implementation form, it is also possible to utilize motion of the dragging mechanism itself (for example, in a manner of a hoisting and recycling pull cord), to drag the carrier platform 2 to pass across the scanning area of the inspection device 9. The horizontal driving mechanism may also be a pushing mechanism that imparts a pushing force to the carrier platform 2.

In FIG. 1, the AGV 1 as an unmanned controlled travelling device, may support the carrier platform 2 in advance and wait for the vehicle 4 to be inspected at the loading station A. When the vehicle 4 to be inspected reaches the upper surface of the carrier platform 2 to perform a favorable support and fixation, the AGV 1 in a state of supporting the carrier platform 2, carries the carrier platform 2 and the vehicle 4 to be inspected to move to the inspection station B. Upon reaching the inspection station (e.g. one side of the inspection device 9), the lifting mechanism of the AGV 1 lowers the carrier platform 2 until the supporting ground. At this time, the AGV 1 no longer forms a support for the carrier platform 2 and then the AGV 1 moves out from under the carrier platform 2, and one end of the AGV 1 is connected to one end of the carrier platform 2 by means of the connecting pin 8 (for example, corresponding to one end at the front or rear of the vehicle 4 to be inspected).

In FIG. 1 and FIG. 2, the inspection process is the process that the AGV 1 drags the carrier platform 2 and the vehicle 4 to be inspected to pass across the scanning area of the inspection device 9. Since the AGV 1 is outside the scanning area when the vehicle 4 to be inspected is scanned, the AGV 1 can shield the vehicle image as less as possible, so as not to significantly affect the scanning result of the vehicle 4 to be inspected.

The scanning area may be provided according to the structural form, principles and performance of the inspection device. Considering the circumstance that an article in the vehicle to be inspected can be more clearly inspected from the top, it is preferable to use a top radiation scanning inspection device 9, capable of forming a scanning area from top to bottom. In order to facilitate receiving the radiation penetrating through the vehicle, it is preferable to provide a vertically penetrating through-hole 7 on the middle of the platform body (see FIG. 3).

After the vehicle 4 to be inspected is scanned, if the inspection device finds that the vehicle carries dangerous or contraband goods (such as explosives, drugs, etc.), it may refuse the vehicle to enter the smart garage, or notify the relevant department for further validation. After confirming the of the vehicle after scanning, the AGV 1 re-enters under the carrier platform 2, and raises the carrier platform 2 by means of the lifting mechanism to leave the ground. Then, the AGV 1 conveys the carrier platform 2 and the inspected vehicle from the inspection station B to the next target location, for example, the parking area C or the exit of the inspection area. The AGV 1 after lowering the carrier platform 2 and supporting the ground by means of the lifting mechanism, moves out from the space under the carrier platform 2, and then moves to a position or a standby position of the next carrier platform 2.

When the smart garage receives a unloading instruction, the unmanned controlled travelling device moves to the parking area C of a vehicle 5 to be unloaded, and then drives the carrier platform 2 carrying the vehicle 5 to be unloaded to move to the unloading station D. afterwards, the vehicle 5 to be unloaded may leave the carrier platform 2, and be driven away from the smart garage.

Figure 3:
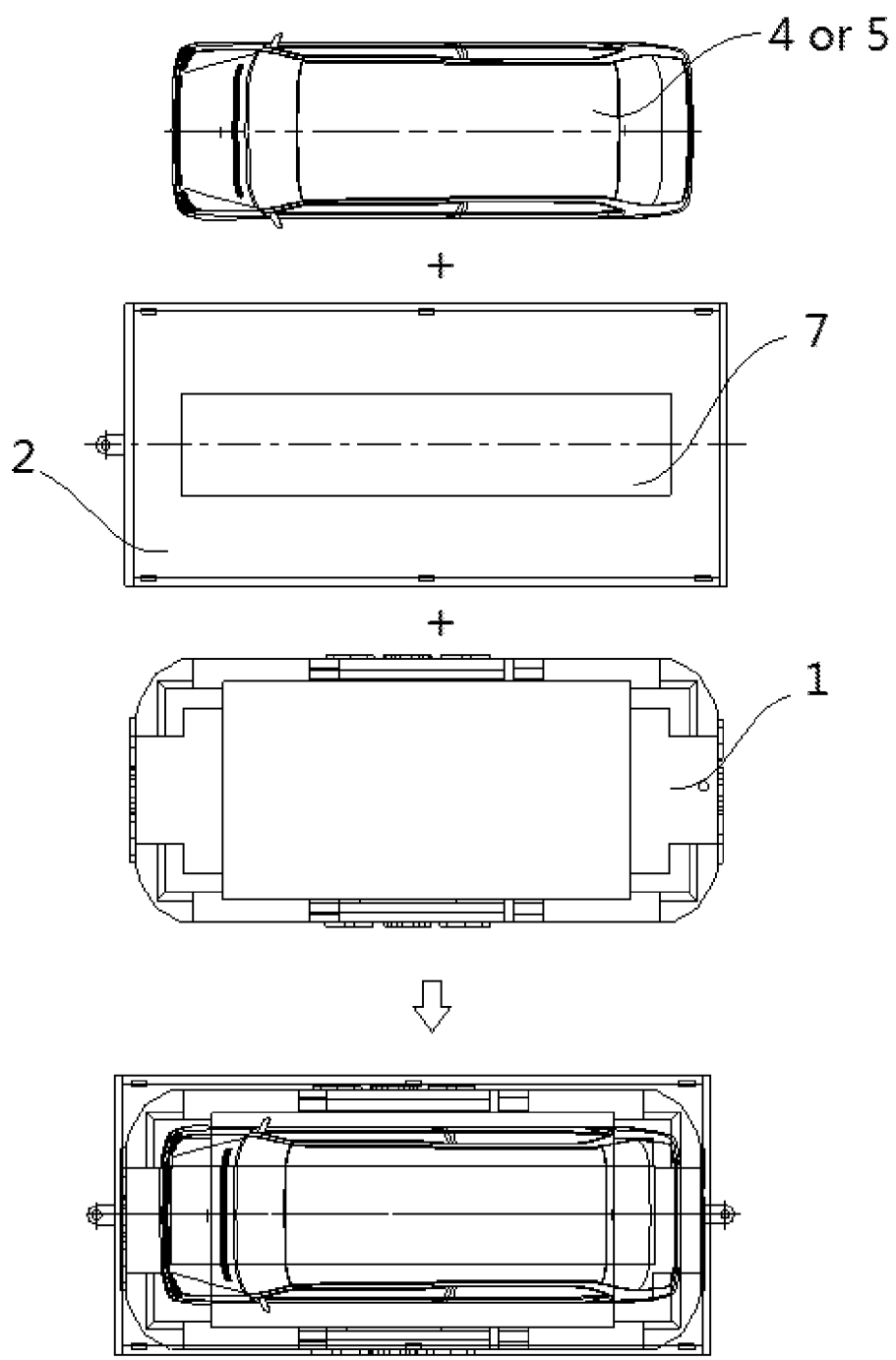
FIG. 3 is a schematic view of a combination manner of a vehicle, a carrier platform and an AGV in an embodiment of the vehicle inspection system of the present disclosure.

FIG. 3 shows a combination manner of a vehicle, a carrier platform and an AGV. Among them, the vehicle may be the vehicle 4 to be inspected, the inspected vehicle or the vehicle 5 to be unloaded. A through-hole 7 may be provided on the middle of the carrier platform 2, to facilitate penetration of the radiation. The vehicle may be parked at the upper surface of the carrier platform 2 and fixed by a fixing means on the carrier platform 2. The AGV 1 can use a conventional AGV, while the lifting mechanism and the dragging mechanism may be mounted on the AGV 1, and can perform a plurality of actions such as travelling of the vehicle body, lifting of the carrier platform 2, and connection to and disengagement from the carrier platform 2 under remote control or automatic program control. The height of the AGV 1 may be lower than the height of the lower surface of the platform body of the carrier platform 2 so that the AGV 1 can smoothly enter and exit from the space under the carrier platform 2.

The aforementioned vehicle inspection system is not only suitable for a smart garage or various kinds of parking garages, but also suitable for other occasions where vehicle inspection is required. For example, there is inspection when a vehicle enter and exit from some important public places (such as government departments, stadiums, theaters, etc.).

On the basis of the aforementioned vehicle inspection system, the present disclosure further sets forth an vehicle inspection method, comprising:

after the vehicle 4 to be inspected is loaded on the carrier platform 2, the unmanned controlled travelling device moves the carrier platform 2 to pass through a scanning area of the inspection device 9, to perform an inspection of the vehicle 4 to be inspected on the carrier platform 2;

after inspection of the vehicle 4 to be inspected is accomplished, the unmanned controlled travelling device drives the carrier platform 2 to another target area. Among them, the another target area may be a designated parking area or an exit for inspection area corresponding to the vehicle 4 to be inspected.

The unmanned controlled travelling device may include a vehicle body, a vertical driving mechanism and a horizontal driving mechanism, and the vertical driving mechanism and the horizontal driving mechanism are disposed on the vehicle body. Correspondingly, the step that the unmanned controlled travelling device drives the carrier platform 2 to pass through a scanning area of the inspection device 9 may comprise that:

the unmanned controlled travelling device carries the carrier platform 2 by moving the carrier platform 2 off the ground by means of the vertical driving mechanism. The vertical driving mechanism may include a lifting mechanism, such that the carrier platform 2 contains the unmanned controlled travelling device under the carrier platform 2 when the carrier platform 2 is located on the ground, and the unmanned controlled travelling device moves the carrier platform 2 off the ground by the lifting mechanism under the carrier platform 2.

When the vehicle body moves to the vicinity of the inspection device 9, the vertical driving mechanism moves the carrier platform 2 to the ground, and the horizontal driving mechanism drives the carrier platform 2 to pass through the scanning area of the inspection device 9. The horizontal driving mechanism may include a dragging mechanism. Correspondingly, the step that the horizontal driving mechanism drives the carrier platform 2 to pass through the scanning area of the inspection device 9 may comprises: connecting the connecting piece of the dragging mechanism with the carrier platform 2, and dragging the carrier platform 2 across the scanning area of the inspection device 9 by movement of the vehicle body.

In the embodiments of the aforementioned method, before the vehicle 4 to be inspected is located on the carrier platform 2, there may further comprise that: the unmanned controlled travelling device conveys the empty carrier platform 2 to the loading station A so that the vehicle 4 to be inspected travels on its own or is driven to the carrier platform 2.

In addition, the embodiments of the aforementioned method may further comprise that: upon receiving a unloading instruction, the unmanned controlled travelling device moves to the parking area C of a vehicle 5 to be unloaded, and drives the carrier platform 2 carrying the vehicle 5 to be unloaded to move to the unloading station D.

Finally, it should be explained that: the aforementioned embodiments are only used to describe the technical solution of the present disclosure rather than limiting the same; although detailed explanations are made to the present disclosure by referring to embodiments, a common technical person in the art should understand that: it is still possible to make amendments to the embodiments of the present disclosure or make equivalent replacements to part of the technical features; without departing from the spirit and scope of the present disclosure, they should all be covered in the scope of the technical solution for which protection is sought in the present disclosure.

The invention claimed is:

1. A vehicle inspection system, comprising:
   an inspection device configured to perform an inspection on a vehicle;
   a carrier platform configured to carry the vehicle to be inspected; and
   an unmanned controlled travelling device configured to carry the carrier platform that is loaded with the vehicle; wherein
   the unmanned controlled travelling device is configured to move the carrier platform through a scanning area of the inspection device to perform the inspection on the vehicle; and the carrier platform comprises a platform body configured to form a space accommodating the entry of the unmanned controlled travelling device between the platform body and ground.

2. The vehicle inspection system according to claim 1, wherein the unmanned controlled travelling device comprises:
   a vehicle body configured to travel under remote control, and carry the carrier platform; and
   a connecting piece provided on the vehicle body, configured to connect the carrier platform and drag the carrier platform that is loaded with the vehicle across the scanning area of the inspection device by movement of the vehicle body.

3. The vehicle inspection system according to claim 1, wherein, the unmanned controlled travelling device is an Automated Guided Vehicle.

4. The vehicle inspection system according to claim 1, wherein a vertically penetrating through-hole is provided in the middle of the platform body, and the inspection device is a top radiation scanning inspection device, for forming a scanning area from a top of the vehicle to a bottom of the carrier platform.

5. A vehicle inspection method, comprising:
   loading a vehicle to be inspected onto a carrier platform, moving, by an unmanned controlled travelling device, the carrier platform through a scanning area of an inspection device to perform an inspection of the vehicle on the carrier platform; and
   after the inspection of the vehicle is accomplished, driving by the unmanned controlled travelling device, the carrier platform to another target area;
   wherein the another target area is a designated parking area or an exit that includes a safety inspection area corresponding to the vehicle to be inspected.

6. The vehicle inspection method according to claim 5, wherein the unmanned controlled travelling device comprises a vehicle body, a vertical driving mechanism and a horizontal driving mechanism, the vertical driving mechanism and the horizontal driving mechanism are disposed on the vehicle body;
   the method further comprising:
   when the unmanned controlled travelling device drives the carrier platform to pass through a scanning area of the inspection device, the unmanned controlled travelling device lifts the carrier platform off the ground with the vertical driving mechanism; and
   when the unmanned controlled travelling device moves to the vicinity of the inspection device, the vertical driving mechanism unloads the carrier platform, and transfer the carrier platform to the ground, and couples to the carrier platform using the horizontal driving mechanism, the unmanned controlled traveling device drives the carrier platform through the scanning area of the inspection device.

7. The vehicle inspection method according to claim 6, wherein the horizontal driving mechanism comprises a dragging mechanism that includes a connecting piece;
   the method further comprising:
   connecting the connecting piece of the dragging mechanism to the carrier platform by the unmanned controlled traveling device, and driving the carrier platform through the scanning device includes dragging the carrier platform through the scanning area of the inspection device.

8. The vehicle inspection method according to claim 6, wherein the vertical driving mechanism comprises a lifting mechanism, and
   the unmanned controlled travelling device moves under the carrier platform when the carrier platform is on the ground, and lifts the carrier platform off the ground with the lifting mechanism to load the carrier platform onto the unmanned controlled travelling device.

9. The vehicle inspection method according to claim 5, wherein the unmanned controlled travelling device conveys an empty carrier platform to the loading station before the vehicle to be inspected is loaded onto the carrier platform, the vehicle to be inspected travels on its own or is driven to the carrier platform.

10. The vehicle inspection method according to claim 5, wherein, upon receiving a unloading instruction, the unmanned controlled travelling device moves to the parking area of a vehicle to be unloaded, loads the vehicle, and moves the carrier platform carrying the vehicle to be unloaded to the unloading station.

* * * * *